(No Model.) 7 Sheets—Sheet 1.

E. D. LEAVITT, Jr.
VALVE GEAR.

No. 380,329. Patented Apr. 3, 1888.

Witnesses:
Walter E. Lombard
Judson Hilte

Inventor:
Erasmus D. Leavitt, Jr.,
by N. C. Lombard.
Attorney.

(No Model.)

7 Sheets—Sheet 3.

E. D. LEAVITT, Jr.
VALVE GEAR.

No. 380,329. Patented Apr. 3, 1888.

Witnesses:
Walter E. Lombard.
Judson Hill.

Inventor:
Erasmus D. Leavitt, Jr.,
by N. C. Lombard
Attorney.

(No Model.)  
E. D. LEAVITT, Jr.  
VALVE GEAR.

No. 380,329. Patented Apr. 3, 1888.

Witnesses:  
Walter E. Lombard.  
Judson Hill.

Inventor:  
Erasmus D. Leavitt, Jr.,  
by N. C. Lombard.  
Attorney.

(No Model.) 7 Sheets—Sheet 5.
E. D. LEAVITT, Jr.
VALVE GEAR.
No. 380,329. Patented Apr. 3, 1888.
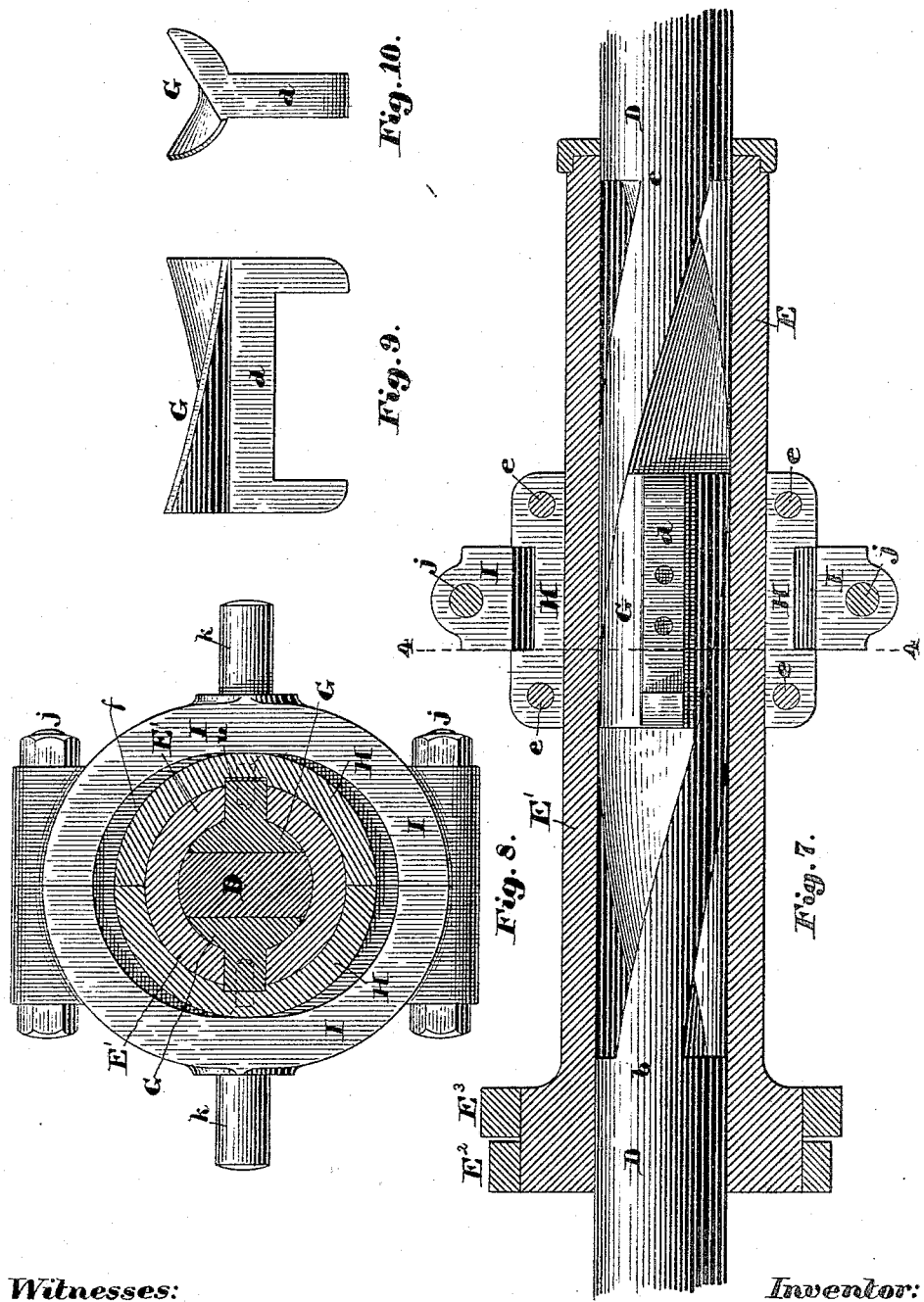

(No Model.) 7 Sheets—Sheet 6.
E. D. LEAVITT, Jr.
VALVE GEAR.
No. 380,329. Patented Apr. 3, 1888.
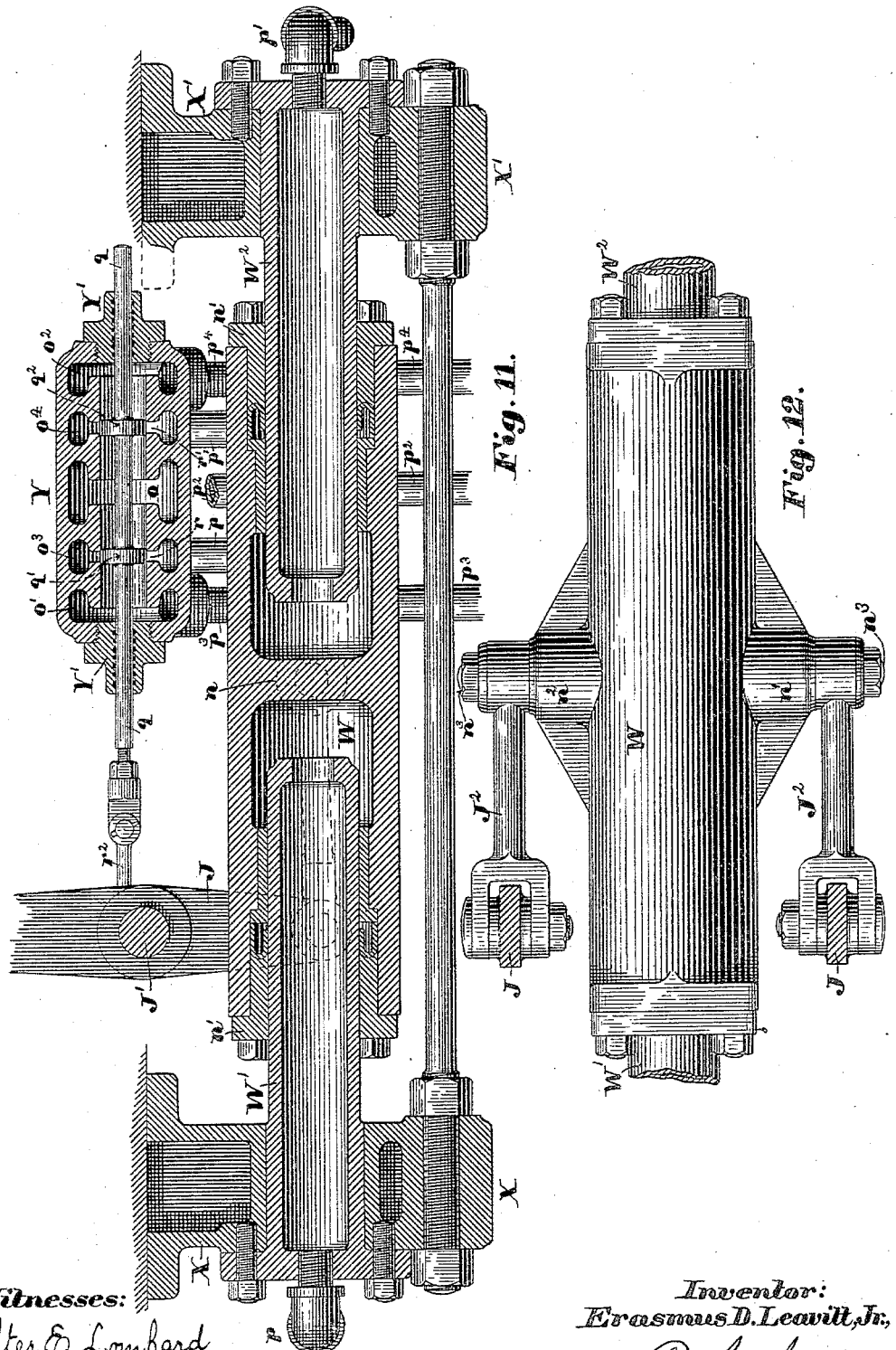

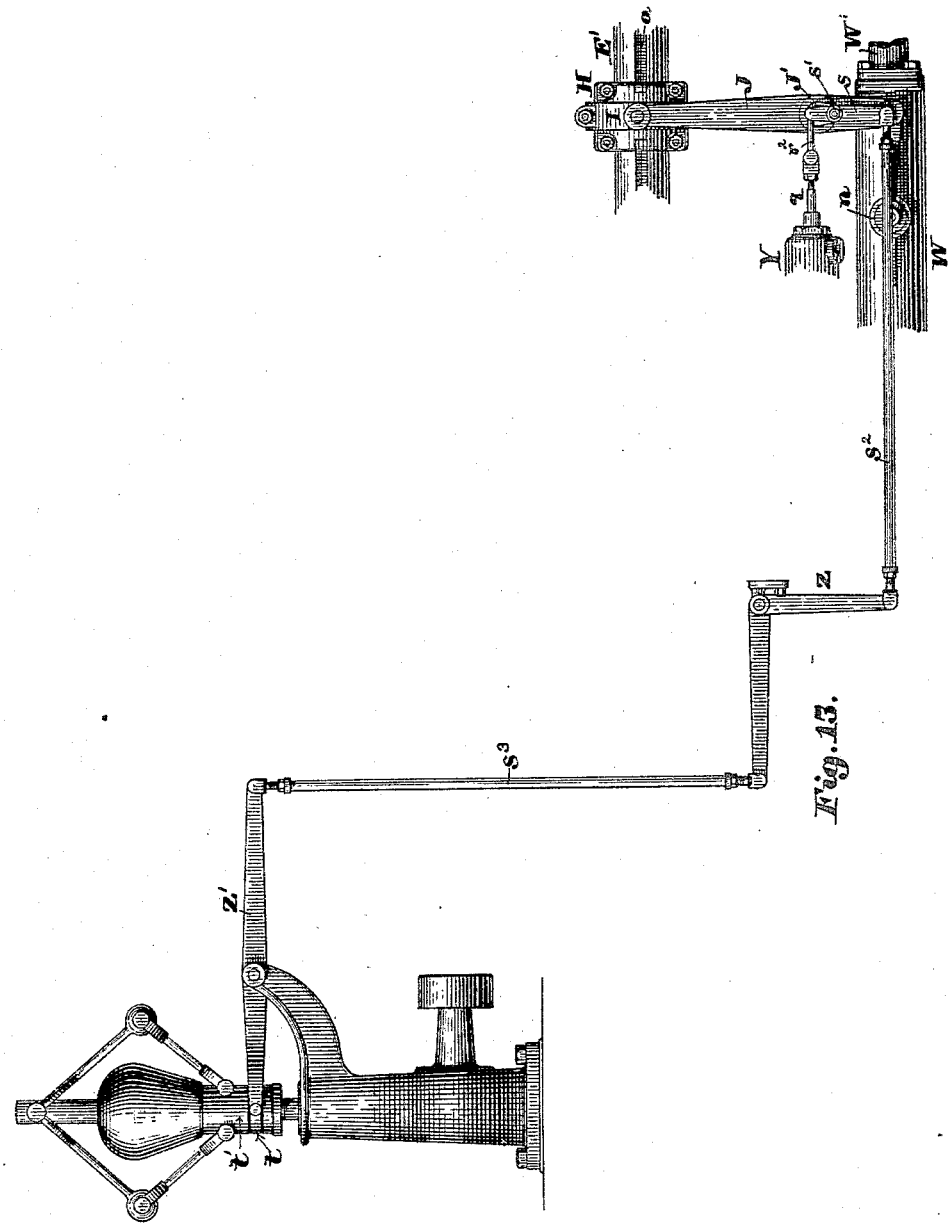

UNITED STATES PATENT OFFICE.

ERASMUS D. LEAVITT, JR., OF CAMBRIDGEPORT, MASSACHUSETTS.

VALVE-GEAR.

SPECIFICATION forming part of Letters Patent No. 380,329, dated April 3, 1888.

Application filed October 10, 1887. Serial No. 251,895. (No model.)

*To all whom it may concern:*

Be it known that I, ERASMUS D. LEAVITT, Jr., of Cambridgeport, in the county of Middlesex and State of Massachusetts, have invented certain new and useful Improvements in Valve-Gears for Steam-Engines, of which the following, taken in connection with the accompanying drawings, is a specification.

My invention relates to valve-gears for steam-engines having horizontal cylinders, and especially for that class of such engines as have two independent induction-valves and two independent eduction-valves to each cylinder; and it consists in certain novel features of construction, arrangement, and combination of parts, which will be readily understood by reference to the description of the drawings and to the claims to be hereinafter given.

Figure 1:
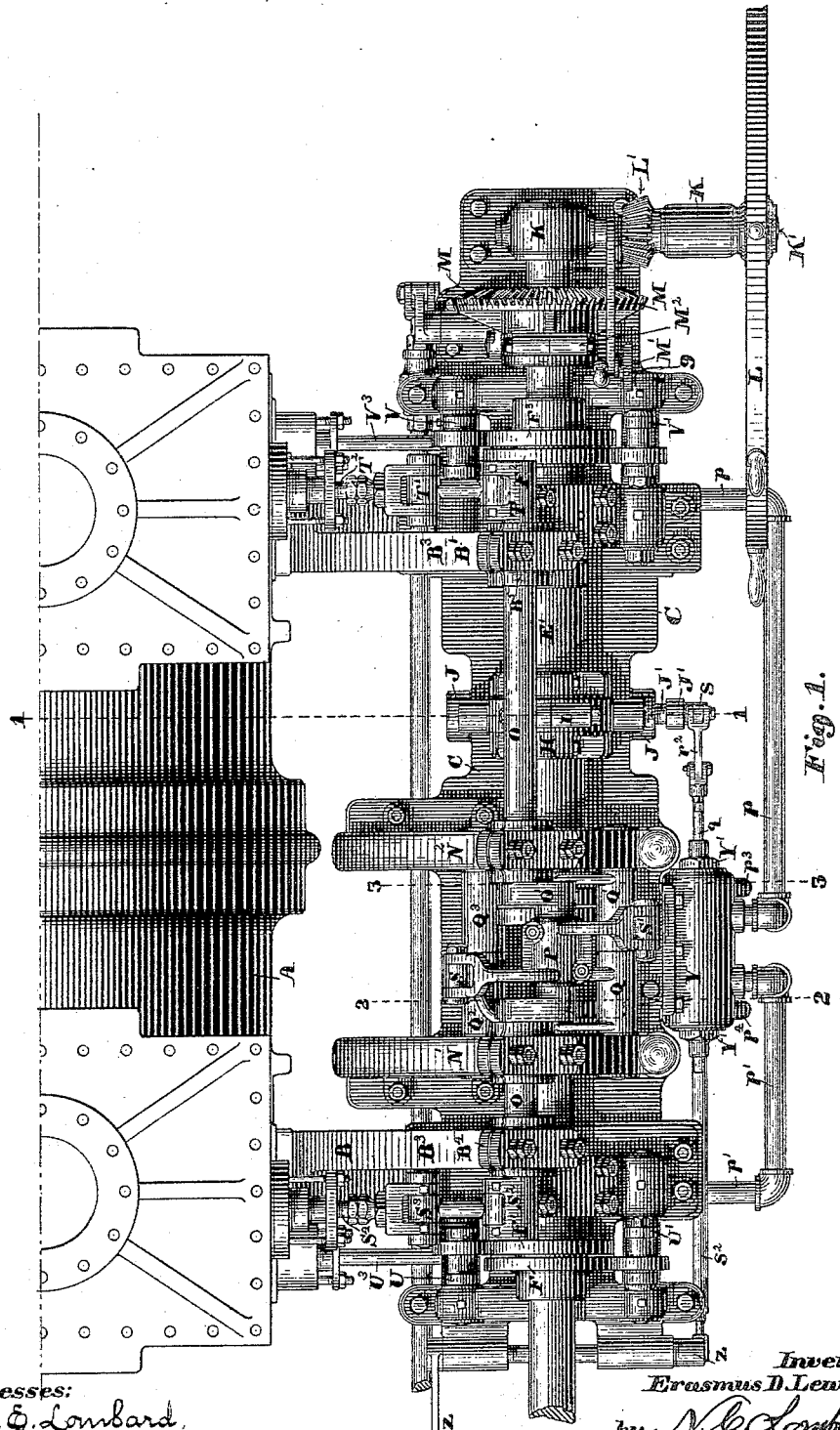
Figure 2:
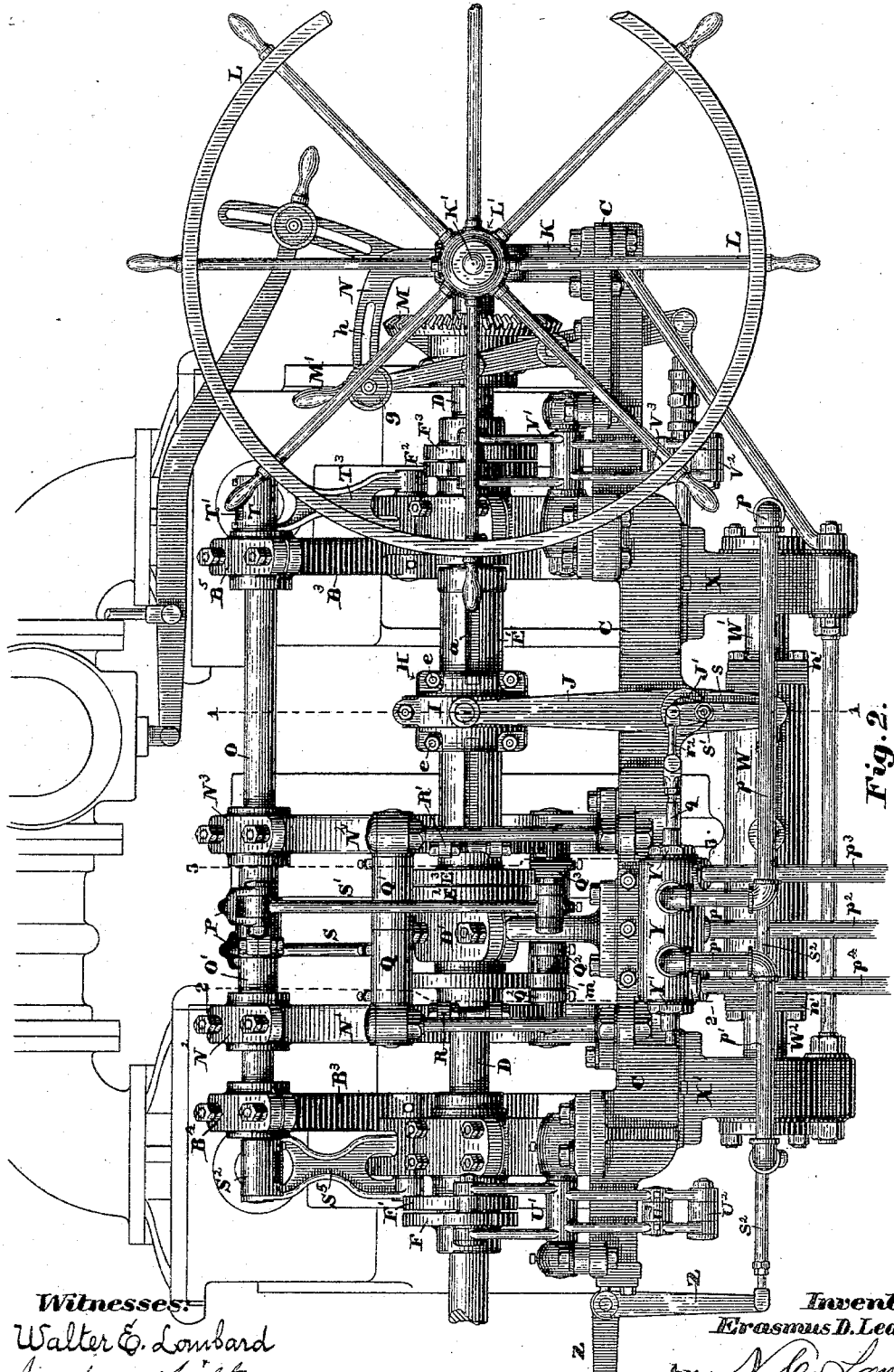
Figure 4:
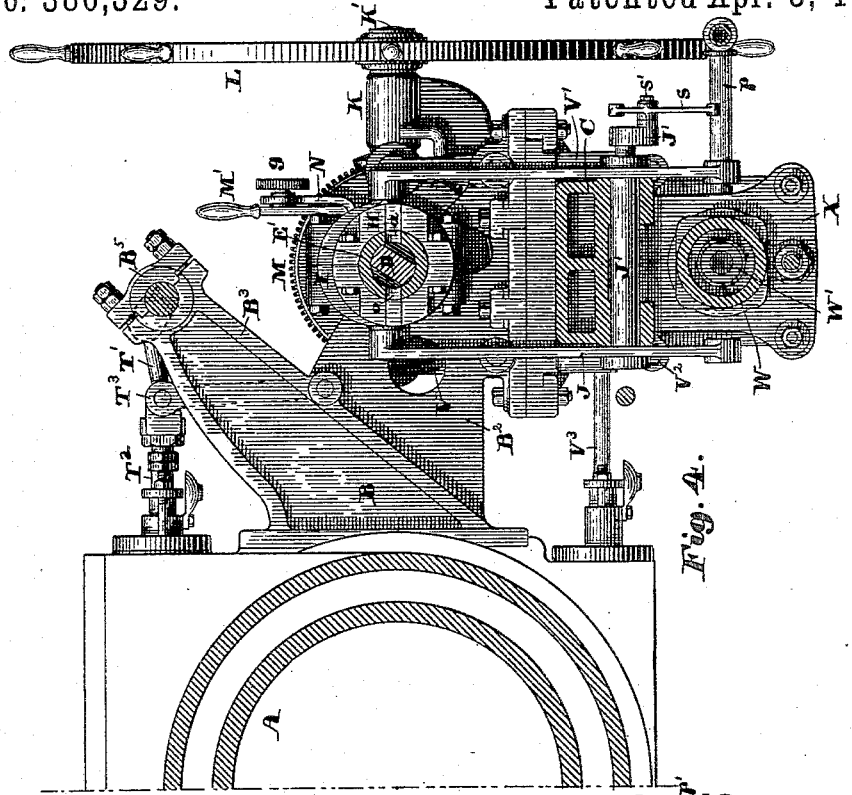
Figure 3:
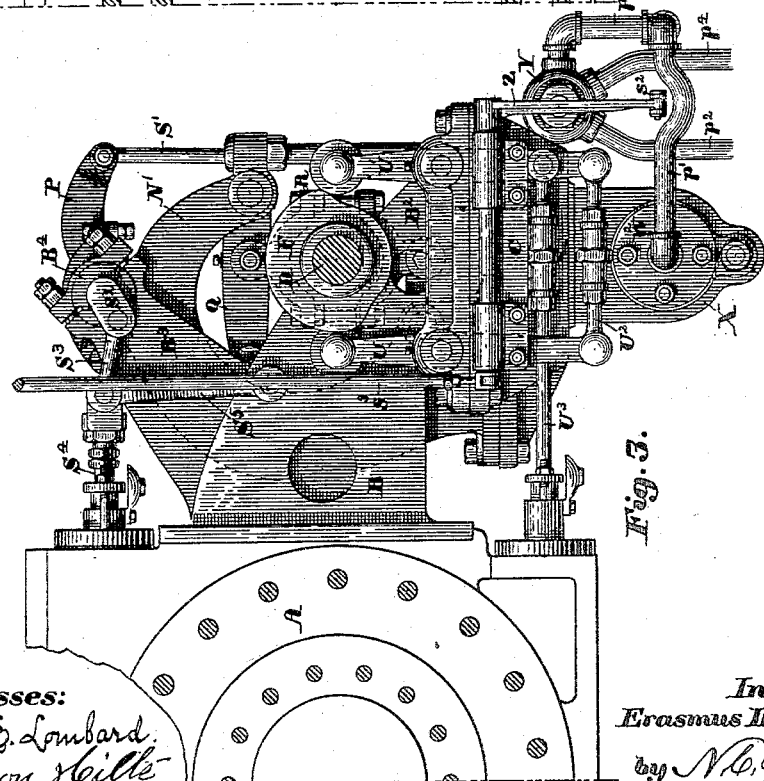
Figure 6:
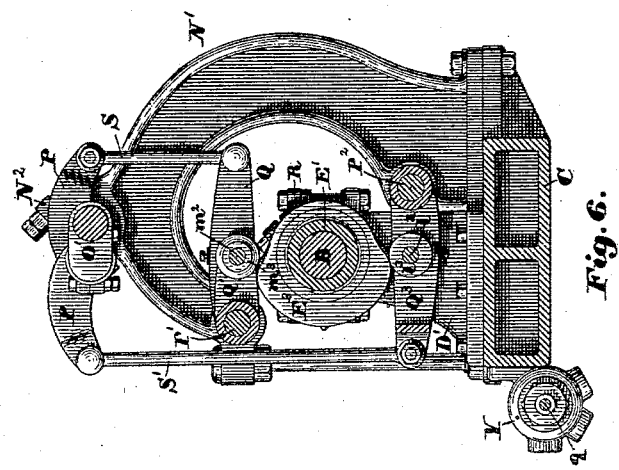
Figure 5:
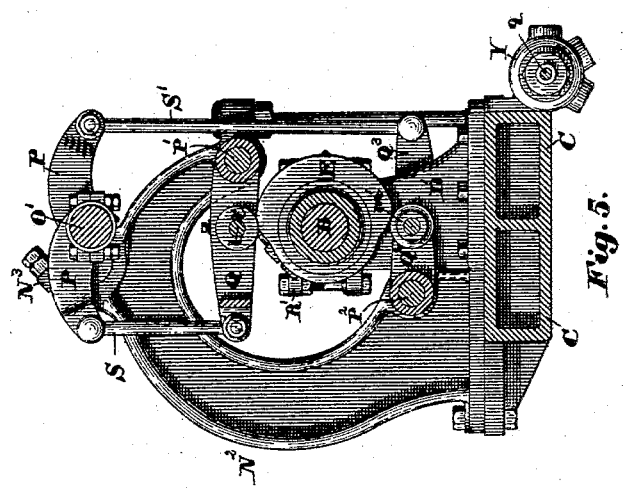

Figure 1 of the drawings is a plan of so much of a steam-engine having my invention applied thereto as is necessary to the proper understanding of the same. Fig. 2 is a front elevation of the same. Fig. 3 is an end elevation of the same, with the cam-shaft cut in section. Fig. 4 is a vertical section on line 1 1 on Figs. 1 and 2, and showing the parts at the right of said line in elevation. Fig. 5 is a vertical section on line 2 2 on Figs. 1 and 2, and showing the inlet cam and certain other parts at the right of said line in elevation. Fig. 6 is a vertical section on line 3 3 on Figs. 1 and 2, and showing the cut-off cams and certain other parts in elevation. Fig. 7 is a longitudinal section through the cut-off cams, their sleeve, the adjusting and shoe carrying collars, and showing a section of the cam-shaft and one of its shoes in elevation. Fig. 8 is a transverse section on line 4 4 on Fig. 7. Figs. 9 and 10 are respectively a side elevation and an end view of one of the shoes fitted to bear upon one of the flattened sides of the spiral portion of the cam-shaft. Fig. 11 is a vertical section through the centers of the hydraulic cylinder and the water-valve cylinder, looking toward the right of Figs. 3 and 4. Fig. 12 is an inverted plan of the hydraulic cylinder and portions of its supporting-plungers and the links for moving the shipper-levers. Fig. 13 is an elevation of the governor and its connections. Figs. 7 to 12, both inclusive, are drawn to an enlarged scale and Fig. 13 to a reduced scale.

In the drawings, A is the steam-cylinder, arranged with its axis in a horizontal position, and provided with independent steam or induction valves and two independent exhaust or eduction valves similar to those described in Letters Patent No. 229,240, granted to me July 16, 1872, and as they form no part of my present invention they are not shown in the drawings and need not be described here.

B and B' are two heavy brackets or stands bolted firmly to the side of the cylinder, one near each end thereof, and projecting therefrom at right angles to the axis of said cylinder, each of said stands having two arms, $B^2$ and $B^3$, the former being provided at their under sides and outer ends with horizontal flanges, by which and suitable bolts they are firmly secured to the valve-gear-supporting table C, which extends beyond said brackets or stands to the right and left, as shown in Figs. 1 and 2.

D is the cam-shaft mounted in bearings on the arms $B^2$ of the stands B and B' and in the stand D', secured to the upper side of the table C between the stands B and B', and having mounted thereon the inlet-cam E, the sleeve E', carrying the two cut-off cams $E^2$ and $E^3$, and the two pairs of exhaust-cams F F' and $F^2$ $F^3$, arranged relative to each other as shown in Figs. 1 and 2.

The sleeve E' has formed therein two longitudinal slots directly opposite each other, one of which is shown at *a* in Fig. 2 and both in Fig. 8.

The shaft D has a portion of its diameter cut away upon two opposite sides from *b* to *c* (see Fig. 7) to form a spiral having a cross-section nearly rectangular and two broad parallel opposing sides, to which are fitted the two shoes G, each provided with the outwardly-projecting rib *d*, to fit the slots *a* in the sleeve E' and corresponding shallow grooves formed in the inner periphery of the collar H, a small portion, *d'*, of said rib at each end extending outward to the periphery of said collar H and fitting radial grooves formed in the ends of said collars, as shown in Fig. 2.

The collar H is made in two pieces and secured together by bolts $e$ $e$, and has formed in its periphery the circumferential groove $f$, in which is loosely fitted the shipper-collar I, also made in two parts, secured together by the bolts $j$ $j$, and provided with the trunnions $k$ $k$ to receive the upper ends of the cut-off-adjusting levers J, mounted upon a short shaft, J', having its bearings in the table C, as shown in Fig. 4.

The shaft D has a fourth bearing in the stand K, secured to the upper side of the table C, which stand is forked and has mounted in one branch thereof the short shaft K', upon one end of which is secured the hand-wheel L and upon the other end the bevel-pinion L', the teeth of which engage with the teeth of the bevel gear-wheel M, so mounted upon the cam-shaft D that while it must revolve therewith it is free to be moved endwise thereof to cause it to engage with said pinion or disengage it therefrom, which movement is obtained by means of the shipper-lever M' and collar $M^2$, fitted to a circumferential groove formed in the hub of said gear-wheel M, as shown in Figs. 1 and 2.

The shipper-lever M' is secured in position at either extreme of its vibration by means of the binding-nut $g$ and its bolt, which passes through the segmental slot $h$ in the stand N, as shown in Figs. 1 and 2.

N' and $N^2$ are two stands curved to a form somewhat resembling the letter C, and firmly bolted to the upper surface of the table C, which stands have formed at their upper sides bearings $N^2$ and $N^3$, respectively, in which and bearings $B^4$ and $B^5$, formed upon the outer ends of the arms $B^3$ of the brackets B and B', respectively, is mounted the rocker-shaft O, which has formed therein between the bearings $N^2$ and $N^3$ a crank, O', upon the crank-pin of which is mounted the two-armed lever P, arranged to be vibrated about said crank-pin at the same time that said crank-pin is vibrated about the axis of said shaft O.

The stands N' and $N^2$ are connected together by the fixed or non-revoluble shafts P' and $P^2$, upon the former of which are mounted so as to be movable about the axis thereof the levers Q and Q', and upon the latter in like manner are mounted the levers $Q^2$ and $Q^3$, as shown in Figs. 5 and 6.

The lever Q has mounted upon a journal, $l$, set therein near the middle of its length, the cam-truck $l'$, which rests upon the face of the inlet-cam E, said journal $l$ being connected to a similar journal or wrist-pin, $m$, set in the free end of the shorter lever, $Q^2$, and carrying the cam-truck $m'$ by the stirrup-like connection R. (Shown in dotted lines in Fig. 3 and partially in full lines in Figs. 2, 5, and 6.)

The free end of the lever Q is connected by the rod S to the rear end of the lever P, the front end of which is connected by the rod S' to the free or front end of the lever $Q^3$, which is provided with a wrist-pin, $l^2$, carrying the cam-truck $l^3$, to bear upon the cut-off cam $E^2$, and connected by the stirrup-like link R' to the wrist-pin $m^2$, set in the free end of the shorter lever, Q', which wrist-pin $m^2$ has mounted thereon the cam-truck $m^3$, which rests upon and is acted upon by the face of the cut-off cam $E^2$, all as shown in Figs. 2, 3, 5, and 6.

The rocker-shaft O has secured upon its left-hand end, as seen in Figs. 1 and 2, a crank-arm, $S^2$, which is connected by the link $S^3$ to the inlet-valve rod $S^4$, the outer end of which is supported and guided by the radius-arm $S^5$, as shown in Fig. 3. The opposite end of the shaft O has secured thereon a similar crank, T, connected in like manner, by the link T', to the inlet-valve rod $T^2$, the outer end of which is supported and guided by the radius-arm $T^3$, as shown in Fig. 4.

F and F' are the cams for operating the exhaust-valve at the left of Fig. 1 through the medium of the levers U U', link $U^2$, and valve-stem $U^3$; and $F^2$ and $F^3$ are the cams for operating the exhaust-valve at the right of Fig. 1 through the medium of the levers V V', the link $V^2$, and valve-stem $V^3$, all as shown in Figs. 1, 2, and 4.

W is a reciprocating hydraulic cylinder, provided with a central partition, $n$, and a stuffing-box, $n'$, at each end to fit the fixed plungers W' $W^2$, projecting inward from the brackets X and X', bolted to the under side of the table C, upon which plungers said cylinder W is alternately moved in opposite directions by the pressure of water admitted through said plungers upon the partition $n$. The cylinder W is also provided with two bosses, $n^2$ $n^2$, in which are set the wrist-pins $n^3$ $n^3$, upon each of which is mounted one end of one of the links $J^2$ $J^2$, the opposite end of which is pivoted to the lower end of one of the cut-off adjusting-levers J, all as shown in Figs. 11 and 12.

Y is a valve-cylinder, bolted to the front edge of the table C in a fixed position, and provided with an annular inlet-chamber, $o$, exhaust-chambers $o'$ and $o^2$, and similar chambers, $o^3$ and $o^4$, communicating through pipes $p$ and $p'$ with the interiors of the plungers W' and $W^2$, respectively. (See Figs. 11 and 12.)

Water is supplied to the valve-cylinder through the pipe $p^2$ from a pump, (not shown,) and the water, after doing its work in the hydraulic cylinder W, is forced therefrom through the pipe $p$ or $p'$, through the exhaust-chamber $o'$ or $o^2$, and thence through $p^3$ or $p^4$ to any convenient waste-receptacle. (Not shown.)

The valve-cylinder Y has fitted therein the valve-stem $q$, upon which are formed the two disk-valves $q'$ and $q^2$, adapted to open and close the annular ports $r$ and $r'$, respectively, said valve-stem having bearings in the screw-heads Y' and being rendered tight by water-packing, as shown in Fig. 11. One end of the valve-stem $q$ is connected by the link $r^2$ to the upper end of the lever $s$, fulcrumed upon the crank-pin $s'$, formed upon the end of the rocker-shaft J', (see Fig. 4,) the lower end of said lever $s$ being connected by the rod $s^2$ to the vertical arm of the elbow-lever Z, the other arm of which is connected by the rod $s^3$ to one end of the lever Z', the opposite end of which is forked and engages with a circumferential groove, $t$, formed in the vertically-movable sleeve or collar $t'$ of the governor $Z^2$, all as shown in Figs. 1, 2, 3, and 4.

The operation of the hydraulic engine for adjusting the cut-off cams to vary the point of cut-off under the control of the governor is as follows: The several parts being in the positions shown in the drawings, if the engine runs too fast, the balls of the governor will be thrown outward and the sleeve or collar $t'$ will be moved upward, thereby depressing the outer end of the lever Z' and the horizontal arm of the elbow-lever Z, and causing the rod $s^2$ to be moved toward the right of Fig. 2 and move the lever $s$ about its fulcrum, and thus move the valve-stem $q$ toward the left of Fig. 2 and toward the right of Fig. 11, and cause the valves $q'$ and $q^2$ to uncover the ports $r$ and $r'$ in such a manner that the water entering the chamber $o$ from the pump will pass through the port $r'$ to the chamber $o^4$, thence through the pipe $p'$ and plunger $W^2$ to the interior of the cylinder W, where it impinges upon the partition $n$ and causes the cylinder W to be moved toward the right of Fig. 2 and the left of Fig. 11, the water in the opposite end of said cylinder being forced through the plunger W', pipe $p$, chamber $o^3$, port $r$, chamber $o'$, and pipe $p^3$ to the waste-receptacle. This movement of the cylinder W causes a movement of the levers J J and the rocker-shaft J' about the axis of said shaft, so as to move the collar H toward the left of Fig. 2, thereby moving the sleeve E' and the cut-off cams $E^2$ and $E^3$ secured thereon to a greater or less distance about the axis of the cam-shaft D, thus causing the steam to be cut off at an earlier point in the stroke, and thereby reducing the speed of the engine. If the engine runs too slow and the governor-balls fall inward, the motions of all of the parts will be reversed and steam will be admitted to the cylinder through a greater part of the stroke.

Owing to the peculiar arrangement of the lever $s$ upon a fulcrum forming a part of the rocker-shaft J', but eccentric to its axis, the movement of the levers J J and shaft J' caused by the movement of the cylinder W causes the lever $s$ to be moved about its pivotal connection with the rod $s^2$, thereby moving the valves $q'$ and $q^2$ into positions to cover the ports $r$ and $r'$ and shut off the supply of water to the cylinder W. The result produced by this improved valve-gear is substantially the same as is produced by the invention shown and described in another application of mine of even date herewith, in which my invention is applied to a steam-engine having vertical cylinders, and in this application is applied to an engine having a horizontal cylinder. As in said other application, if the cut-off cam is set by the shipper-collar H to close the valve at its earliest point, no steam will be admitted to the cylinder because the motion of the cut-off cam will precede that of the inlet-cam.

As the shipper-collar is drawn back by the governor, the motion of the inlet-cam will take precedence of the cut-off cam and admit steam to the cylinder, which will be cut off sooner or later, according to the position of the cut-off cam on the shaft relative to the inlet-cam, as determined by the shipper-collar H.

It will be seen by reference to Figs. 5 and 6 of the drawings that one end of lever P is connected by the rod S to the rear end of the lever Q, while the opposite end of said lever is connected by the rod S' to the front end of the lever $Q^3$. The lever Q is connected by the yoke R to the lever $Q^2$, and the lever Q' is connected by the yoke R' to the lever $Q^3$, and hence if the cams are set as shown in the drawings both ends of the lever P will be moved the same distance, and the axis of the crank-pin O' upon which it is mounted, will move an equal distance vertically, which distance will equal the throw of the cams. It will also be seen that the crank-arms $S^2$ and T are so set upon the shaft O that when one of said crank-arms is approaching the dead-point in its movement the other arm is moving away from the dead-point in its movement, from which it results that when one valve is moving the slowest the other valve is moving the fastest, and vice versa, both valves being moved with a constantly-varying speed during the time of opening and closing the same.

The construction of the spiral on the cam-shaft D and the shoes G co-operating therewith (shown and described in this application) is an improvement upon the devices shown and described in the said prior patent hereinbefore referred to, in that a much more durable wearing-surface is in contact with the shaft, and the further fact that the wear can be taken up or compensated for by placing thin pieces of sheet metal between outer edges of the ribs $d$ and the bottoms of the shallow grooves in the collar H, as indicated at $u$ at the right of Fig. 8.

What I claim as new, and desire to secure by Letters Patent of the United States, is—

1. In a steam-engine provided with an independent induction-valve at each end of the cylinder, the combination, with the inlet-valve stems, of a rocker-shaft provided with a crank-arm at each end and an intermediate crank, a link connecting each of said end crank-arms with one of said valve-stems, a two-armed lever mounted upon and movable about said intermediate crank, a cam-shaft carrying an inlet cam and two cut-off cams, means having provision for adjusting said cut-off cams relative to the inlet-cam, a pair of inlet-cam levers connected together and to one end of said two-armed lever, and a pair of cut-off cam-levers connected together and to the other end of said two-armed lever, all constructed, arranged, and adapted to operate substantially as and for the purposes described.

2. In a steam-engine having an independent induction-valve at each end of its cylinder, the combination of the cylinder, a pair of brackets secured to and projecting from said cylinder, a valve-gear-supporting table secured to said brackets, a cam-shaft carrying an inlet-cam and two cut-off cams, and having provision for adjusting said cut-off cams relative to the inlet-cam, a rocker-shaft provided at each end with a short crank-arm and with an intermediate crank, links connecting said end crank-arms to the inlet-valve stems, a two-armed lever mounted upon said intermediate crank, rods connecting one end of said two-armed lever to the inlet-cam levers and its other to the cut-off-cam levers, and links connecting the inlet-cam levers together and the cut-off-cam-levers together, substantially as described.

3. As a means of adjusting the cut-off cams about the axis of its shaft, the combination of the cam-carrying shaft having a portion of its diameter for a section of its length cut away upon two opposite sides in such a manner as to form a spiral having two opposing parallel sides, a sleeve fitted to and movable circumferentially about said shaft and having mounted thereon the cam to be adjusted, and provided with two longitudinal slots cut through the same upon opposite sides thereof, two shoes, each having an inner surface fitted to a section of a flat side of the spiral of said shaft and provided with ribs to enter and move in the slots in said sleeve, a collar fitted to and movable endwise upon said sleeve and firmly attached to said shoes, and a vibratory lever for moving said collar and shoes endwise upon said sleeve, substantially as described.

4. The combination, in a steam-engine, of the cam-shaft D, having a spiral surface formed in a section of its length, a shoe or gib fitted to said spiral, a sleeve mounted upon said shaft and movable about the axis thereof, and provided with a longitudinal slot into which said shoe or gib extends, a collar fitted to and movable endwise upon said sleeve and firmly secured to said shoe or gib, a lever or levers connected at one end to said collar, a movable hydraulic cylinder mounted upon fixed hollow plungers and connected to said lever or levers, so as to vibrate the same as it moves in either direction, and means having provision for admitting water to either end of said cylinder according to the direction it is desired to move the gib-carrying collar.

5. The combination, with a shaft having a section of its length provided with a spiral surface, a cam-carrying sleeve mounted upon and movable about said shaft, and a collar mounted upon and movable endwise upon said sleeve and carrying a gib or shoe to engage said spiral surface of the cam-shaft, of the levers J J, rocker-shaft J', provided with the crank-pin $s'$, the movable hydraulic cylinder W, provided with the partition $n$, the fixed hollow plungers W' and W², the fixed valve-cylinder Y, connected by suitable pipes to the source of water-supply and to the outer ends of the plungers W' and W², the valve-stem $q$, carrying the piston-valves $q'$ and $q^2$, the lever $s$, fulcrumed upon the crank-pin $s'$ and connected at one end to said valve-stem, and a governor connected to the opposite end of said lever $s$ and adapted to vibrate it and move the valves in the cylinder Y as its balls are thrown outward or fall inward.

In testimony whereof I have signed my name to this specification, in the presence of two subscribing witnesses, on this 24th day of September, A. D. 1887.

ERASMUS D. LEAVITT, JR.

Witnesses:
N. C. LOMBARD,
WALTER E. LOMBARD.